May 31, 1966  L. P. DEACKOFF  3,253,882
APPARATUS FOR ASEPTIC HOMOGENIZATION
OF MILK AND OTHER LIQUID PRODUCTS
Filed April 17, 1962  2 Sheets-Sheet 1
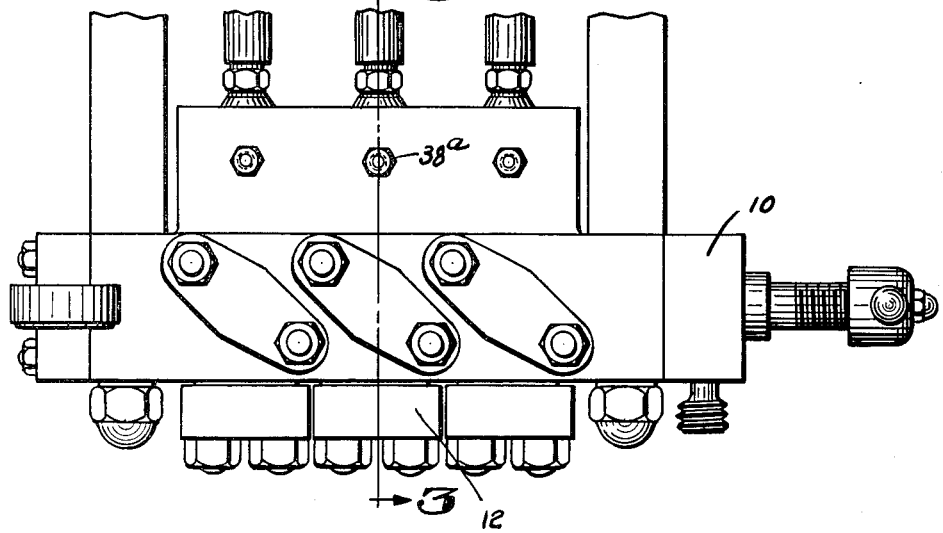
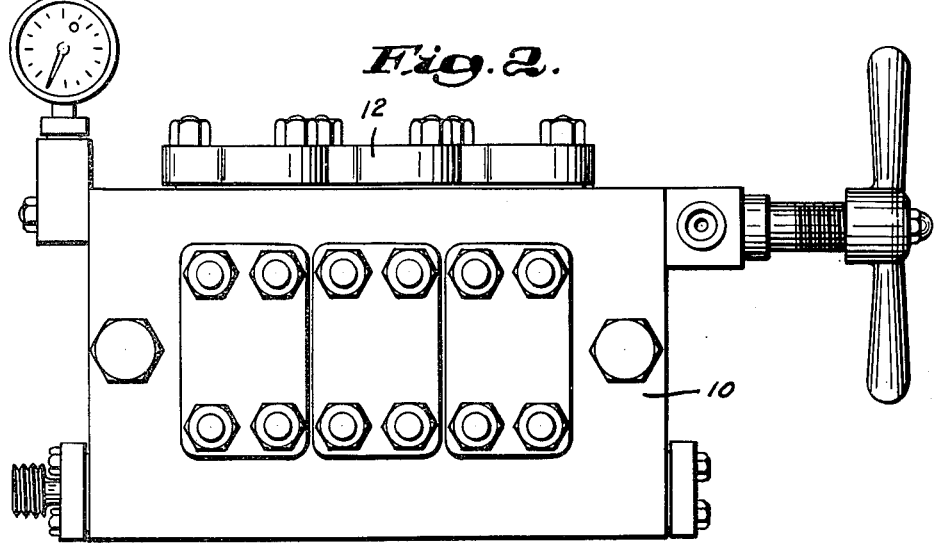
Inventor:
Leon P. Deackoff,
by Munro H. Hamilton
Attorney

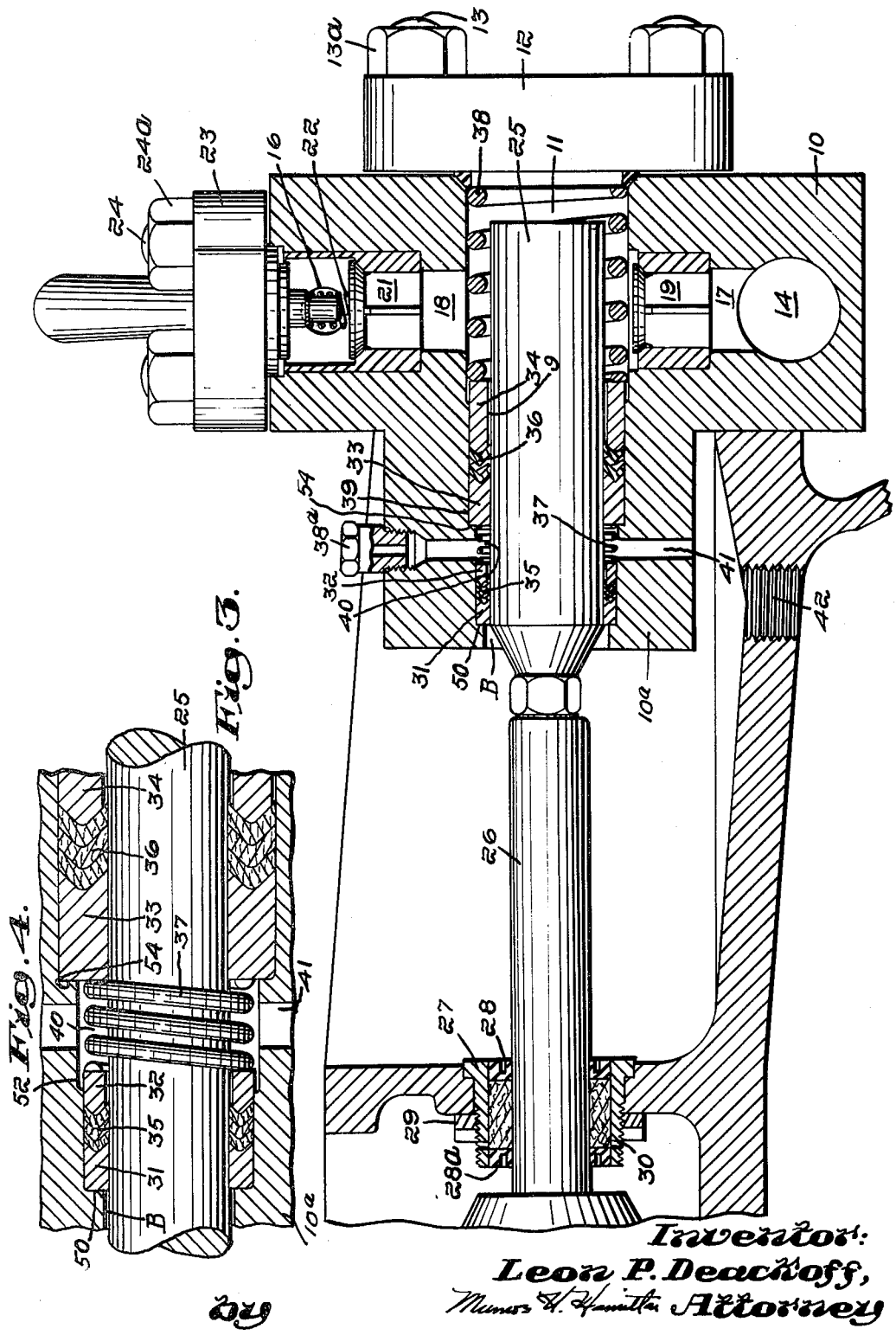

United States Patent Office 3,253,882
Patented May 31, 1966

3,253,882
APPARATUS FOR ASEPTIC HOMOGENIZATION OF MILK AND OTHER LIQUID PRODUCTS
Leon P. Deackoff, Gloucester, Mass., assignor to Manton Gaulin Manufacturing Company, Inc., Everett, Mass., a corporation of Massachusetts
Filed Apr. 17, 1962, Ser. No. 188,172
1 Claim. (Cl. 21—94)

This invention relates to homogenizing milk and similar products and more particularly the invention is concerned with apparatus for aseptic homogenization wherein the homogenizing components are continuously maintained in a sterilized condition.

Operation of conventional homogenizers is of a nature such that parts of the homogenizing apparatus tend to come into contact with the product after having been exposed to a surrounding environment and thus there is difficulty in carrying out a sterile handling of the product. For example, a commonly used form of homogenizer of the reciprocating positive displacement type includes a reciprocate rod or ram. This member is moved through a packing gland into a valve cylinder to effect positive displacement of a liquid contained therein. During this operation a portion of the rod in moving through the packing gland is periodically exposed to the surrounding environment and then moves into contact with the product. Under these conditions growth of certain types of spores and bacteria may occur and the molecular film of product which clings to the rod operates to carry these spores and bacteria back into the sterile working chamber of the homogenizer thereby contaminating the product. Thus the whole purpose of operating a processing plant under sterile conditions may be largely defeated.

It is a chief object of the present invention to improve methods of homogenizing liquid bodies which are required to be maintained in an aseptic condition and to devise means for continuously sterilizing parts of those homogenizing components which are brought into contact with the product and which are also exposed to a surrounding environment.

Another object of the invention is to wash and clean that portion of the rod which comes into contact with the product to remove any material which has collected so that accumulation of a film or coating of material is prevented and wear on both the rod and packing is greatly minimized.

Still another object of the invention is to provide a sterilizing chamber for a positive displacement type pump rod with which a novel arrangement of spring-loaded packing and gland members are combined.

The apparatus of the invention has been devised to accomplish the foregoing objectives by maintaining a sealably isolated portion of the reciprocable plunger, which comes into contact with the product, in a sterile condition. In one preferred embodiment of the invention this may, I find, be accomplished by providing a sealed sterilizing chamber and by treating the plunger portion referred to with a sterlizing agent such as steam furnished to the chamber at a suitably high temperature to provide effective sterilization and applied so as to exercise a cleaning and scouring action.

Another important feature is the provision of special packing ring assemblies which are resiliently held together to maintain the sterilizing chamber in completely sealed relationship with respect to that portion of the cylinder in which pumping takes place.

The nature of the invention and its other objects and novel features will be more fully understood from the following description of a preferred embodiment of the invention selected for purposes of illustration and shown in the accompanying drawings, in which:

FIGURE 1 is a plan view of the improved homogenizer of the invention whic his formed with a novel homogenizer cylinder construction of the reciprocating postive displacement class;

FIGURE 2 is a side elevational view of the homogenizer;

FIGURE 3 is a cross section taken on the line 3—3 of FIGURE 1; and

FIGURE 4 is an enlarged detail sectional view of the sterilizing chamber portion of the mechanism.

In carrying out the method of the invention, I provide for constantly circulating a steriling agent such as steam around a portion of the peripheral surface of the plunger and throughout an annular sterilizing passageway whose axial length exceeds the stroke distance through which the plunger travels in its reciprocating motion. The sterilizing agent is admitted under pressure at one side of the chamber and discharged in either gaseous or condensate form from an opposite side of the sterilizing chamber so that the steam flows along a circular path of travel to contact all parts of the plunger which enter and leave the sterilizing chamber. Hence, a desirable scouring and cleaning action is also realized. In addition, during the entire period in which the sterilizing and cleaning action is taking place, the sterilized plunger surface is constantly sealed along two separated areas by resiliently maintained sealing means which isolate the sterilizing chamber from the homogenizer pumping chamber.

Considering these operations in further relation to the structure shown in the drawings, I provide an aseptic homogenizing apparatus which generally includes a homogenizing cylinder having a pump chamber formed therein; a plunger or ram mounted for reciprocable motion in the pump chamber; inlet and outlet valves for admitting and discharging fluid during movement of the plunger; and a plunger sterilizing chamber located in the homogenizing cylinder in sealed relationship to the pump chamber.

As shown in FIGURE 3, numeral 10 denotes a homogenizer cylinder which is formed with a plunger supporting part 10a. In supporting part 10a is a centrally located opening 9 extending all the way therethrough and terminating in a pumping chamber 11 as is more clearly shown at the right hand side of FIGURE 3. The chamber 11 is sealed at one end by a head 12, the latter being detachably secured to the pump body 10 by threaded fastenings 13 and 13a. Conventional inlet and outlet passages 14 and 16 respectively are formed in the member 10 as shown and communicate with the pump chamber 11 through valve passages 17 and 18. Inlet and outlet valves 19 and 21 are disposed for operation in the valve passages 17 and 18.

The valve spring 22 operates in the well known manner to close the outlet valve 21 and this valve spring is positioned by a stem which is part of head 23. The latter member is fastened to the homogenizer body 10 by studs 24 and nuts 24a. Numeral 25 denotes a reciprocating pump plunger which is located in the plunger supporting part 10a and received through opening 9 so as to extend into pumping chamber 11. An adapter 26 connects the plunger to a suitable reciprocating device which may consist of a crank mechanism of conventional nature and not shown in the drawings. The rod adapter 26 passes through a packing assembly which includes members 28 and 28a, 27 and a locknut 29. A drain 30 provides for release of oil trapped in the assembly.

In accordance with the invention, I construct the plunger supporting part 10a with a series of spaced-apart axially aligned inwardly facing annular shoulders including outer shoulder 50, intermediate shoulder 52 and inner shoulder 54 with which are combined two packing ring assemblies arranged in spaced apart relation to define an intermediate space 40 as is more clearly shown in FIGURE 4. This space 40 constitutes the sterilizing chamber of the invention. Communicating with chamber 40 are transversely located passageways 41 by means of which steam may enter through a fitting 38a and drain away as condensate. It will be noted that the intermediate space 40 constituting the sterilizing chamber is defined at its end in part by the inner end of the outer packing assembly and the outer end of the inner packing assembly.

The two packing ring assemblies surround the plunger 25 as shown to seal this member at either end of the sterilizing chamber 40 and cooperate with one another in a novel manner. As shown in FIGURE 4 an outer packing ring assembly is indicated at the left hand side of the drawing and includes a gland 31 solidly received against outer shouldered portion 50 of the part 10a. Against the gland 31 is located a packing 35 and another gland 32. The second or inner packing ring assembly which is spaced from the outer packing ring assembly and at the opposite side of chamber 40 includes a gland 33 solidly located against inner shouldered portion 54 of part 10a, an intermediate packing 36 and a second gland 34.

I further combine with these two packing assemblies coiled springs 37 and 38 of which spring 38 is substantially larger than spring 37. By means of this arrangement the larger spring 38 when in a compressed state, as shown in FIGURE 3, resiliently bears against the inner adjacent packing assembly to hold this assembly against the shoulder 54 and at the same time the force of spring 38 is transmitted through the packing gland 33 to the spring 37, which spring abuts against the outer face of the inner packing assembly at one end and against the opposite face of the gland 32 of the outer packing assembly at its other end to provide a resilient connection therebetween.

Since spring 37 is weaker than spring 38, it is compressed against the packing gland 32 and resiliently holds the inner packing against the shoulder 50. Thus spring 38 performs two functions and a constant sealing action is realized at both extremities of the sterilizing chamber as the plunger reciprocates. The novel arrangement of parts described greatly simplifies the construction and assembly of parts which is highly important for servicing purposes and a long-life efficient seal is produced at two points. Moreover, the two sealing assemblies are spaced apart a distance greater than the displacement of the plunger and a positive sterilizing is made possible.

In operation a suitable source of steam at a desired temperature is provided and conducted into the fitting 38a and through the passageway 41. As the steam leaves the passageway 41, it comes into contact with a portion of the reciprocating plunger 25 and circulates around an annular passageway which is of an axial length greater than the displacement stroke of the plunger and thus any possibility of contamination from a surrounding environment is effectively prevented. At the same time the steam is completely sealed from the pumping chamber as the plunger moves back and forth and this seal, by reason of its resiliently held packing assemblies, is maintained at all times. Condensate leaves the chamber from its outlet and constant scouring and cleansing action is realized over the exposed surface of the plunger so that any tendency for a film or coating of material to form is prevented.

While I have shown a preferred form of the invention, it is intended that various other sterilizing chamber arrangements as well as other sterilizing fluids than steam may be employed within the scope of the appended claim.

I claim:

In a homogenizer of the class which includes a cylinder provided with a pumping chamber and a plunger mounted for reciprocating motion in the pumping chamber, the combination of a plunger supporting part contiguous to said pumping chamber and surrounding the plunger during reciprocation thereof, said plunger supporting part having three internal annular recesses forming an inner annular shoulder, an intermediate annular shoulder and an outer annular shoulder with respect to said pumping chamber, each said shoulder facing said pumping chamber and said inner and outer annular shoulders forming seats for packing ring assemblies, an inner packing ring assembly having an inner and an outer end seated at its outer end against said inner annular shoulder and an outer packing ring assembly having an inner and an outer end seated at its outer end against said outer annular shoulder, said inner and outer packing ring assemblies in seated position being spaced apart to form an annular steam sterilizing chamber between said outer end of said inner packing ring assembly and said inner end of said outer packing ring assembly, spring means resiliently containing said inner and outer packing ring assemblies in axially compressed relationship to provide a seal at opposite ends of said sterilizing chamber, said spring means comprising a relatively weak spring located in said steam sterilizing chamber between and engaging said outer end of said inner packing ring assembly and said inner end of said outer packing ring assembly and a relatively strong spring located in the pumping chamber and resiliently engaged against said inner end of said inner packing ring assembly, said relatively stronger spring being operative to maintain said inner packing ring assembly in firmly seated relation against said inner annular shoulder and to simultaneously maintain the relatively weaker spring in compression against said outer annular packing ring assembly seated against said outer annular shoulder, means supplying high temperature, high pressure steam to said sterilizing chamber and means removing steam and condensate from said sterilizing chamber.

References Cited by the Examiner

UNITED STATES PATENTS

| | | | |
|---|---|---|---|
| 1,624,573 | 4/1927 | Bagby | 103—153 X |
| 1,800,833 | 4/1931 | Huff | 103—204 |
| 2,655,870 | 10/1953 | Yohpe | 103—153 |
| 2,925,348 | 2/1960 | Boyd | 99—212 X |
| 3,073,256 | 1/1963 | Browne et al. | 103—153 X |

MORRIS O. WOLK, *Primary Examiner.*

E. SZOKE, J. ZATARGA, *Assistant Examiners.*